United States Patent [19]

Röhm

[11] Patent Number: 4,695,066
[45] Date of Patent: Sep. 22, 1987

[54] CHIP-SHEDDING HAMMER-DRILL CHUCK

[76] Inventor: Günter H. Röhm, Heinrich-Röhm-Str. 50, D-7927 Sontheim, Fed. Rep. of Germany

[21] Appl. No.: 808,891

[22] Filed: Dec. 13, 1985

[30] Foreign Application Priority Data

Dec. 15, 1984 [DE] Fed. Rep. of Germany ....... 8436751

[51] Int. Cl.$^4$ .............................................. B23B 31/04
[52] U.S. Cl. ........................................ 279/62; 408/240
[58] Field of Search .............. 279/1 E, 19, 19.1, 19.2, 279/19.3, 19.4, 19.5, 19.6, 19.7, 60, 61, 62, 63, 64, 65, 1 R; 408/239 R, 240, 67, 68; 409/137

[56] References Cited

U.S. PATENT DOCUMENTS

| 1,361,571 | 12/1920 | Eden, Jr. ............................ 279/1 R |
| 4,266,789 | 5/1981 | Wahl et al. ............................ 279/60 |

FOREIGN PATENT DOCUMENTS

| 446245 | 1/1948 | Canada .................................. 279/60 |
| 1183328 | 7/1959 | France .................................. 279/64 |
| 2398571 | 3/1979 | France .................................. 279/62 |

Primary Examiner—Z. R. Bilinsky
Attorney, Agent, or Firm—Karl F. Ross; Herbert Dubno

[57] ABSTRACT

A chuck has a chuck body having an outer surface and formed with a forwardly open hole defining an axis and normally receiving a drill bit, a plurality of angularly generally equispaced guide bores extending at an acute angle to the axis and having inner front ends opening in the hole and outer rear ends opening on the outer surface, and respective chip-shedding passages opening radially inward into the guide bores and radially outward on the outer surface. Respective jaws displaceable in the guide bores have front ends engageable with a bit in the hole and radially outwardly directed teeth. An adjustment ring engaged around the body fits with the teeth of the jaws so that rotation of the ring in one direction advances the jaws in the body and rotation in the opposite direction retracts the jaws for respectively clamping and unclamping the drill bit in the hole.

4 Claims, 1 Drawing Figure

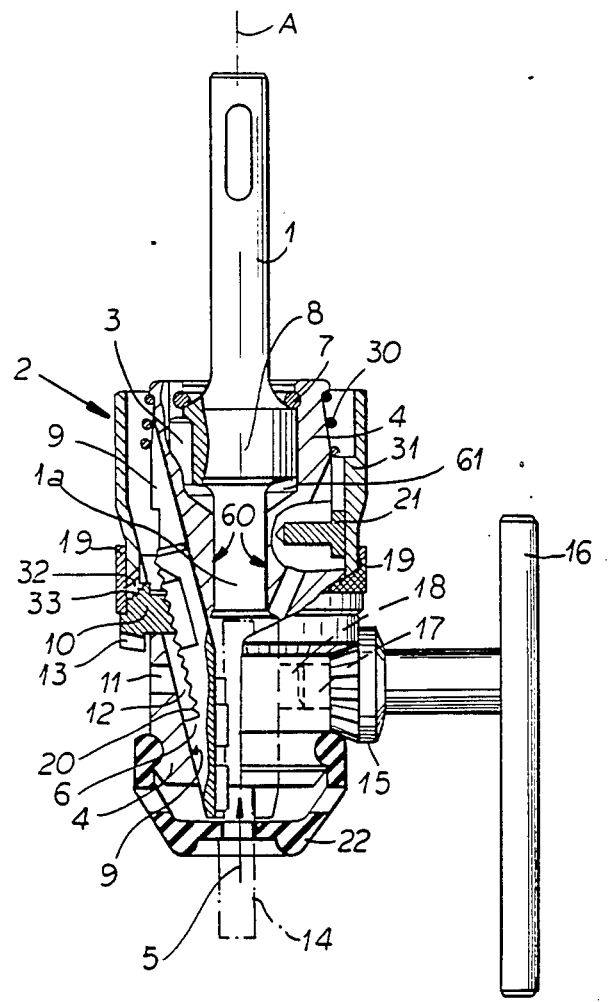

CHIP-SHEDDING HAMMER-DRILL CHUCK

FIELD OF THE INVENTION

The present invention relates to a drill chuck. More particularly this invention concerns a chuck for a hammer drill.

BACKGROUND OF THE INVENTION

A standard type of hammer drill has a drive spindle that is rotated about and limitedly axially reciprocal along a spindle axis. A chuck body is rotationally fixed on the spindle, but can move limitedly axially on it. This body is formed with an axially throughgoing passage into the rear end of which the drive spindle is engaged and into the front of which the shank of a drill bit is engaged. In addition the body is normally formed with three guide bores inclined to the axis and having inner front ends opening into the front end of the passage and outer rear ends opening at a radially outwardly open groove on the body. Respective jaws slidable in these guide bores have front ends engageable radially with the shank of the drill bit and rear ends formed with radially outwardly projecting teeth exposed in the groove. The jaws hold the drill bit so it is centered on the spindle axis, and the front end of the drive spindle acts as a hammer on the rear end of the drill bit. The spindle rotates and axially reciprocates slightly, with the rotation being transmitted via the body and jaws to the bit and the reciprocation being effective directly on the bit.

The jaws are normally urged radially outward by springs and are displaced radially inward by an adjustment ring which is provided in the groove and which has threads that mate with the teeth on the jaws. This ring is formed of a pair of semicircular parts secured together by a knurled sleeve. As a rule the radially inner surface of the ring rides directly on the floor of the groove, so that this ring is supported radially in front of and in back of the apertures where the guide bores open into the groove.

Since the bit moves axially somewhat it is impossible to seal tightly around it, for example with a rubber collar, to prevent chips and dust created by the drilling operation from getting into the chuck. When drilling overhead the particles cut from the workpiece being drilled into therefore sift down and into the chuck. Obviously these particles are extremely detrimental to the tool, so that periodically the chuck must be taken apart and cleaned, an operation that can only be entrusted to a good mechanic. If the particles are not cleaned out frequently the chuck will rapidly wear out; even if frequently removed they will substantially shorten the life of the chuck.

OBJECTS OF THE INVENTION

It is therefore an object of the present invention to provide an improved drill chuck.

Another object is the provision of such a drill chuck which overcomes the above-given disadvantages, that is which is not subject to rapid wear by the buildup of drilling particles inside itself.

SUMMARY OF THE INVENTION

A chuck according to the invention has a chuck body having an outer surface and formed with a forwardly open hole defining an axis and normally receiving a drill bit, a plurality of angularly generally equispaced guide bores extending at an acute angle to the axis and having inner front ends opening in the hole at the front portion thereof and outer rear ends opening on the outer surface, and respective chip-shedding passages opening radially inward into the guide bores and radially outward on the outer surface. Respective jaws displaceable in the grooves have front ends engageable with a bit in the hole and radially outwardly directed teeth. An adjustment ring engaged around the body fits with the teeth of the jaws so that rotation of the ring in one direction advances the jaws in the body and rotation in the opposite direction retracts the jaws for respectively clamping and unclamping the drill bit in the front portion.

Thus any particles created by the drilling that work their way into the chuck will be shed through the passages. They will be in fact expelled radially with some force and considerable effectiveness as the chuck rotates about the axis. This creates an automatic self-purging action which completely eliminates the buildup of grit in the chuck body.

According to another feature of this invention the chip passages extend substantially radially. This orientation makes the centrifugal shedding of particles particularly effective.

In addition according to this invention the chip passages are axially ahead of the adjustment ring and open radially at the teeth of the jaws. Each jaw has a cut back rear edge formed with the respective teeth and forming with the respective bore a space into which the respective chip passage opens. This ensures that this critical region where the teeth of the jaws mesh with the internal screwthread of the ring is kept completely clear of particles.

DESCRIPTION OF THE DRAWING

The above and other features and advantages will become more readily apparent from the following, reference being made to the accompanying drawing whose sole figure is an axial section partly in side view through a chuck according to this invention.

SPECIFIC DESCRIPTION

As seen in the drawing the chuck according to this invention is centered on an axis A and basically comprises a spindle 1, a chuck body 4, jaws 6, an adjustment ring 10, and a locking system 2.

The body 4 is formed with a throughgoing bore 5, 60 having a rear portion 60 and a front portion 5. The front portion 5 normally receives a drill bit whose outline is indicated at 14. A hammer-like front end 1a of the spindle 1 engages in the rear portion 60. In addition the rear (upper in the drawing) end of the bore 5, 60 has a widened portion 61 receiving a cylindrically enlarged part 8 of the spindle 1. A snap ring 7 retains this part 8 in the widened portion 61 while permitting limited axial play and a key 3 rotationally locks the spindle 1 to the body 4. During normal drilling therefore the rotation of the spindle 1 is transmitted via the key 3 to the body 4 and the axial reciprocation of this spindle 1 is effective directly from its hammer end 1a on the rear end of the bit 14.

The chuck body 4 is formed with three guide bores 9 all extending at the same acute angle to the axis A and each receiving a respective one of the jaws 6 which are formed along the rear portion of their outer edges with angled teeth 20. The bores 9 have front ends opening into the front portion 5 so that the front ends of the jaws 6 can grip the bit 14, angularly coupling it to the chuck body 4. An elastomeric cuff 22 is engaged over the front end of the chuck body 4 and radially grips the bit 14.

In addition the chuck body 4 is formed generally between the front and rear passage portions 5 and 60 with a radially outwardly open groove receiving the adjustment ring 10 which is formed of two semicircular pieces held together by a knurled sleeve 19. This ring 10 is formed with forwardly directed teeth 13 that can mesh with the teeth of a pinion 15 of a chuck key 16 having a pilot pin 17 engageable in a radial hole 18 of the front part of the chuck body 4. The ring 10 is formed with an internal screwthread in mesh with the teeth 20 of the teeth 6.

The locking system 2 comprises a sleeve 31 urged axially forward by a spring 30 and axially slidable at its front end in the sleeve 19 holding the ring 10 together. The front end of the sleeve 31 is formed with teeth 32 that can mesh with backwardly directed teeth 33 of the ring 10. A T-shaped key 21 rotationally couples the sleeve 31 to the body 4. Thus when the teeth 32 and 33 are engaged together the ring 10 is locked on the body 4. Pulling the sleeve 31 back against the force of its spring 30 disengages the teeth 32 and 33 from each other and allows the ring to be turned either manually by the ring 19 or by means of the key 16.

According to this invention the outer edges of the jaws 6 are cut back at the teeth 20 to form open spaces 12 in the respective guide bores 9. In addition the chuck body 4 is formed at each of the jaws 6 with a radial chip passage 11 opening radially outward on the chuck body 4 between the ring 10 and the front end of the chuck body 4 and radially inward into the spaces 12. Thus any particles that work their way back into the chuck when drilling overhead and finding their way into the spaces 12 will be radially shed through the holes 11. Centrifugal force will propel such particles radially outward, effectively keeping the chuck clean at this important region of mesh of the teeth 20.

I claim:

1. A chuck comprising:
   a chuck body having an outer circumferential surface and formed with
      a forwardly open hole defining an axis and normally receiving a drill bit projecting axially forward from the body,
      a plurality of angularly generally equispaced guide bores extending at an acute angle to the axis and having inner front ends opening in the hole at the front portion thereof and outer rear ends opening on the outer surface, and
      respective chip-shedding passages opening radially inward into the guide bores between the inner and outer ends thereof and radially outward on the outer surface;
   respective jaws displaceable in the bores and having front ends engageable with a bit in the hole and radially outwardly directed teeth; and
   an adjustment ring engaged around the body and fitting with the teeth of the jaws, whereby rotation of the ring in one direction advances the jaws in the body and rotation in the opposite direction retracts the jaws for respectively clamping and unclamping the drill bit in the front portion.

2. The drill chuck defined in claim 1 wherein the chip-shedding passages extend substantially radially.

3. The drill chuck defined in claim 1 wherein the chip-shedding passages are axially ahead of the adjustment ring and open radially inward at the teeth of the jaws.

4. The drill chuck defined in claim 1 wherein each jaw has a cut back rear edge extending generally parallel with the respective bore, formed with the respective teeth, and forming with the respective bore a space into which the respective chip passage opens.

* * * * *